June 22, 1943.   F. P. LAWLER   2,322,697
CRANE ATTACHMENT FOR TRACTORS
Filed May 15, 1942

INVENTOR
FRANK P. LAWLER
BY
Castberg & Roemer
ATTORNEYS

Patented June 22, 1943

2,322,697

UNITED STATES PATENT OFFICE 2,322,697

CRANE ATTACHMENT FOR TRACTORS

Frank P. Lawler, Chicago, Ill., assignor of one-half to Mayer R. Robinson, Burlingame, Calif.

Application May 15, 1942, Serial No. 443,073

2 Claims. (Cl. 212—8)

This invention relates to a crane attachment for tractors and especially a crane which is adapted to be mounted on standard tractors of the self-laying track type.

The object of the invention is generally to improve and simplify the construction and operation of structures of this character; to provide a crane structure which is adapted to be attached to a tractor in such a manner that the dead and live loads which it superimposes on the tractor will be applied at points insuring the least strain and injury to the tractor parts; to provide a crane which is so mounted and attached to the tractor that the reactive forces of the boom and its frame will meet at a common point substantially central of the width and length of the tractor; to provide a frame for the crane which is utilized to support one or more counter weights and a hoisting unit and in which the total weight of the frame, the counter weights, and the hoisting unit serves to counter-balance the weight of the boom and loads applied thereto; and further, and more specifically stated, to provide a frame which is supported at the front end by the two track frames of the tractor and at the rear by the main frame of the tractor, whereby load applied to the boom and frame of the crane is mainly applied through the track frames and the track rollers to the tracks, and the ground or surface over which they travel.

The invention is shown by way of illustration in the accompanying drawing, in which Fig. 1 is a side elevation of the crane attachment mounted on a tractor.

Figure 2:
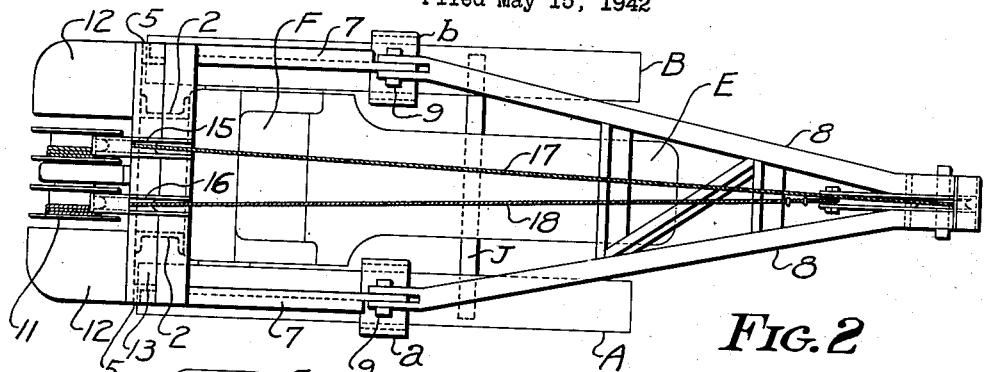
Fig. 2 is a plan view of Fig. 1.
Figure 3:
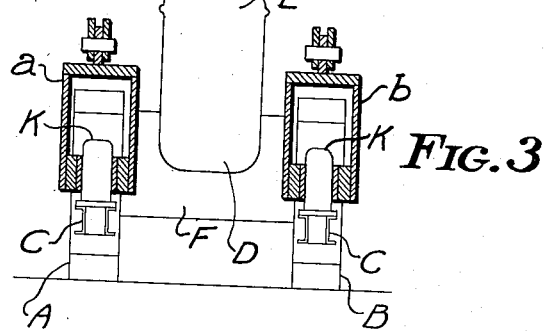
Fig. 3 is a cross section on line 3—3 of Fig. 1.
Figure 1:
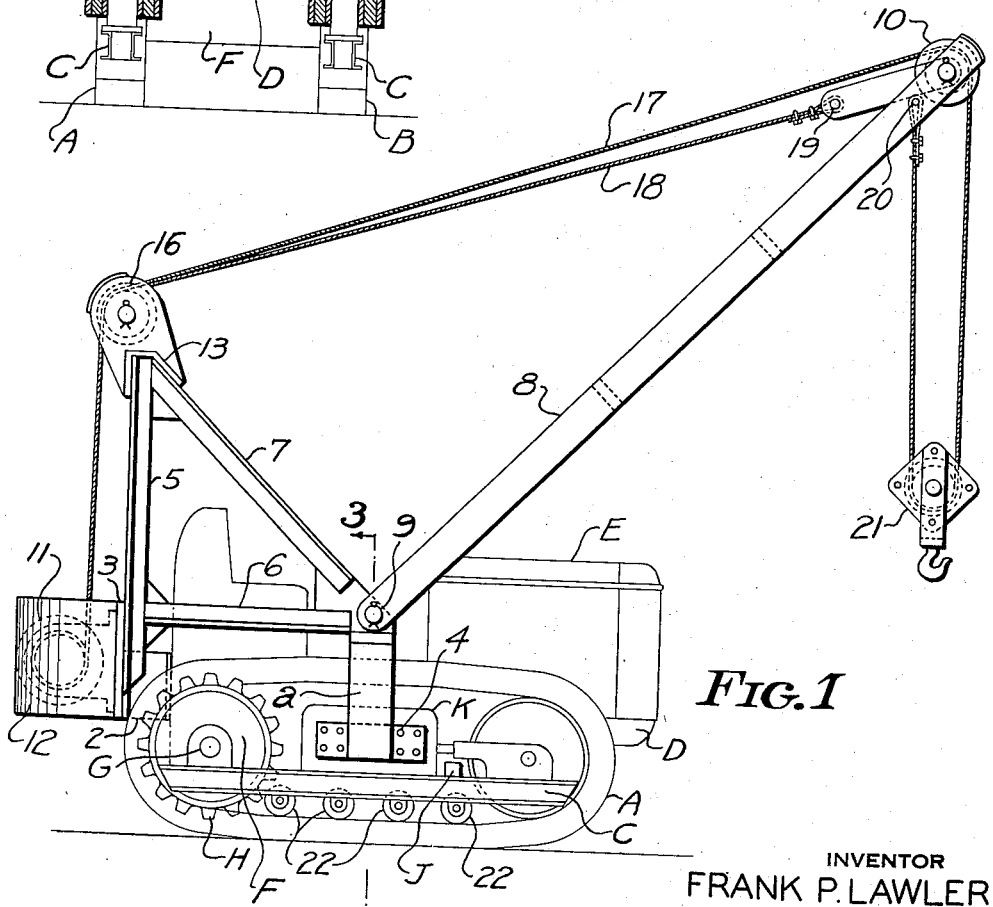

Referring to the drawing in detail, and particularly Figs. 1 and 2, A and B indicate the endless track members of a tractor of the self-laying track type, C the structural beams forming the main portion of each track frame, and D the main frame of the tractor which supports the engine E and the transmission F. Extending through the transmission is a drive shaft G on opposite ends of which are secured sprocket gears H, whereby the respective track members are driven. In standard tractor construction the rear ends of the track frames, or rather the beams C pivot about shaft G as the front ends are usually supported by a transverse spring secured beneath the front end of the main frame. In this instance the transverse spring is removed and a solid axle J is substituted, which is secured both to the main frame and the respective track frames or beams C so as to render the track frames rigid with relation to each other and the main frame of the tractor, a desirable feature, by the way, when the crane boom and its frame are attached, as will hereinafter be described.

The rear face of the transmission housing in tractors of this type usually presents a flat machined surface which in this instance is utilized to receive a pair of channel shaped brackets 2—2 and a transversely disposed end plate 3, which parts are secured by bolts, welding, or otherwise. Straddling each track member A and B is a U-shaped frame and these are indicated at $a$ and $b$. These frames may be secured to the housings K, which contain the front idler take-up mechanism and the recoil springs, as shown at 4, or they may be directly secured to the beams C of the track frames. The end plate 3, together with the respective U frames $a$ and $b$ form a support for the frame and the boom of the crane, and the manner in which these are constructed and secured will now be described.

Secured at each end of the end plate 3 is a vertical structural member 5 of an A frame, and extending from each vertical member 5 to an adjacent U frame is a horizontal member 6. A pair of diagonal structural members 7—7 connects the U frames and the upper ends of the vertical members 5, and a pair of A frames are thus formed which are supported at their front ends by the U frames and at their rear ends by the end plate 3. The boom is formed by two arms 8—8 which at their lower ends are pivoted at 9—9 where the horizontal and diagonal members of the A frames are secured to the U frames. The upper ends of the boom arms converge and may be connected throughout a portion of their length by a lattice work or cross members in the normal manner, and a boom point sheave 10 is journaled in the usual way at the point or upper end of the boom.

The end plate 3 performs other functions besides that of supporting and securing the rear ends of the A frames, as it will be noted in Figs. 1 and 2 that a two-drum hoist, generally indicated at 11 is secured thereto and so are a pair of containers 12—12, which are provided for the purpose of receiving counter-weighting material of any character such as iron or lead. The importance of so placing the hoist and the counter weights will later be described.

In actual operation, a top cross beam 13 connects the upper ends of the A frames. This cross beam carries a pair of rooster or idler sheaves 15 and 16 and over these sheaves are led cables 17 and 18. Cable 18 is dead-ended at one end to the peak of the boom at 19, while the other end passes over sheave 16 which leads it to one of the drums on the hoist. Cable 17 is also dead-ended to the peak of the boom as at 20. It then passes down and under a sheave hook block 21; then up and over the boom point sheave; then over the rooster sheave 15, and finally to the other drum of the hoist. The hoist may be driven in the usual way through a power take-off shaft on the tractor, and when one drum is driven, a load attached to the hook block sheave may be raised or lowered while operation of the second drum will raise or lower the boom.

As previously stated the solid axle J serves to hold the track frame structural beams C in rigid relationship to the main frame of the tractor D and this is essential because the A frame is a rigid frame which connects the tractor main frame D to the track members A and B through the agency of the end plate 3, the channel shaped brackets 2—2 and the U frames a and b, and this rigid connection would become strained if the front end of the track members A and B were free to oscillate in the usual manner.

From the foregoing it should be obvious that a simple, rigid frame and boom structure is provided, and that by attaching it to the tractor in the manner described and shown, the major forces produced when lifting a load will be directed to the pivotal points at the lower end of the boom, and through the U-frames to the track frames and track supporting rollers 22 directly to the ground or surface over which the tractor is traveling or standing, and further that any tendency of the boom when loaded to overend the tractor is counter balanced first by the hoist, secondly by the weight of the A frame, and thirdly by the addition of as much counterweighting material as may be found necessary. The main frame of the tractor, the engine and transmission carried thereby, or, in other words, the main mechanism of the tractor is thus subjected to a minimum strain, incident to operation of the crane attachment and long life and dependable operation are assured.

Having thus described my invention, what I claim and desire to secure by Letters Patent is:

1. The combination with the main frame and the track frames of a tractor of the self-laying track type, of a U-shaped supporting member secured to and straddling each track frame at a point substantially midway of the length of the track frames, a cross-plate secured to the rear end of the main frame, a pair of A-frames disposed one on each side of the tractor and secured at their forward ends to the respective U-shaped supporting members and at their rear ends to the cross-plate, a boom arm pivotally supported on the respective U-shaped supporting members, a hoist secured to the cross-plate to operate the boom arms, and means rigidly connecting the track frames to the main frame of the tractor.

2. The combination with a main frame and the track frames of a tractor of the self-laying track type, of a supporting member on each track frame, a cross-plate secured to the rear end of the main frame, a crane frame supported at its front end to the supports on the track frames and at its rear end by the cross-plate on the main frame, a boom pivoted to the front end of the crane frame at a point where substantially all loads and stresses applied to the boom and the crane frame will be transmitted mainly to the supports on the track frames, a bar extending cross-wise on the tractor, and means rigidly securing the bar to the forward ends of the track frames and to the main frame to secure the track frames against oscillating movement with relation to the main frame.

FRANK P. LAWLER.

CERTIFICATE OF CORRECTION.

Patent 2,322,697.  June 22, 1943.

FRANK P. LAWLER.

It is hereby certified that the name of the assignee of one-half interest in the above numbered patent was erroneously written and printed as "Mayer R. Robinson" whereas said name should have been written and printed as --Mayes R. Robinson--, as shown by the record of assignments in this office; and that the said Letters Patent should be read with this correction therein that the same may conform to the record of the case in the Patent Office.

Signed and sealed this 24th day of August, A. D. 1943.

(Seal)

Henry Van Arsdale,
Acting Commissioner of Patents.